United States Patent [19]
Ireland

[11] 3,792,351
[45] Feb. 12, 1974

[54] ABSORPTION FREQUENCY METER HAVING SHIELDED INDUCTOR

[76] Inventor: Frank E. Ireland, 7425 S.W. 34th Street Rd., Miami, Fla. 33155

[22] Filed: Mar. 10, 1972

[21] Appl. No.: 233,409

[52] U.S. Cl. .................................................. 324/81
[51] Int. Cl. ............................................. G01r 23/00
[58] Field of Search .............. 324/81, 43; 250/39; 317/249 TX; 336/84; 334/30, 64, 36, 82 X

[56] References Cited
UNITED STATES PATENTS

| | | | |
|---|---|---|---|
| 2,276,743 | 3/1942 | Shimizu et al. | 324/81 |
| 2,731,589 | 1/1956 | Marsh | 336/84 X |
| 2,989,630 | 6/1961 | Crooker | 334/82 X |

*Primary Examiner*—Alfred E. Smith

[57] ABSTRACT

An absorption frequency meter having a high-Q circuit comprising a resonant circuit having variably adjustable concentric capacitive plates, electrically in series with an inductance means and an indicating means, said capacitive plates providing electromagnetic shielding for said inductance means.

10 Claims, 3 Drawing Figures

PATENTED FEB 12 1974  3,792,351

PRIOR ART 3,792,351

ABSORPTION FREQUENCY METER HAVING SHIELDED INDUCTOR

BACKGROUND OF THE INVENTION

This invention relates generally to an electronic testing device that allows for the measurement of the radiation frequency of various electrical components, such as transmitters, antenna, and the like. Frequency and wave length measuring devices are well-known in the art, such as wave meters or beat frequency meters. These meters indicate fundamental or harmonic frequencies of operation on a calibrated scale. In general, an unknown frequency is determined by coupling a variably tunable circuit to the unknown frequency source and variably adjusting a reactive circuit element until a resonant condition is established in the circuit. An absorption wave or frequency meter is one having a capacitance and an inductance in a circuit, and in addition an indicating device, such as a lamp. One of the problems encountered in using an absorption frequency meter has been in the area of coupling. Overcoupling tends to produce a distortion in reading of the frequency as a function of current strength at the point of resonance and usually a double maximum type of curve is producted making the adjustment for finding the point of resonance inaccurate and difficult to specifically measure. Also, overcoupling can overpower a particular frequency indicating element within the absorption frequency meter and thus damage it. Applicant has devised an absorption frequency meter in which the capacitive element acts as a shield to prevent overcoupling, thus increasing the accuracy and dependably of a particular frequency meter.

BRIEF DESCRIPTION OF THE INVENTION

An absorption frequency meter comprising a high-Q series circuit having a capacitance, an inductance, and a circuit resonant indicating means in series with said inductance and said capacitance. The capacitance and inductance elements are arranged so that the plate of the capacitive element substantially shields the inductance from an overcoupling external electromagnetic energy source and simultaneously prevents radiation of electromagnetic energy from the inductive means to the external device being measured. The device is a small hand-held frequency meter requiring no external power source other than the RF source to be measured, and having a resilient positioning probe at one end to provide uniform separation between the electric component being tested and the hand-held absorption frequency meter. A light bulb provides a resonance indication when the device is adjusted so as to produce a maximum intensity of the light bulb, maximum intensity occurring at resonance.

It is an object of this invention to provide an absorption frequency meter having increased accuracy.

It is another object of this invention to provide a compact, self-contained frequency indicating device.

It is still another object of this invention to provide a frequency measuring device of increased reliability.

Still another object of this invention is to provide a frequency measuring device with a high-Q circuit in which overcoupling is reduced or eliminated.

And yet another object of this invention is to provide a frequency meter having a shielded inductive element.

In accordance with these and other objects which will be apparent hereinafter, the instant invention will now be described with particular references to the accompanying drawing.

DESCRIPTION OF THE PREFERRED EMBODIMENT

Figure 1:
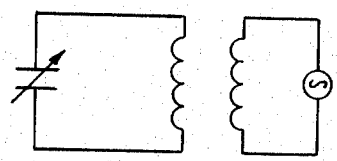
FIG. 1 is a schematic circuit diagram showing the prior art.

FIG. 1 shows a schematic diagram of a simple circuit having both a capacitive and an inductive element, the resonance indicating device being excluded for the sake of simplicity. The use of such circuit in a frequency measuring device is wellknown in the art. Applicant employs a circuit utilizing basically the same electrical principles in which resonance is achieved in a series circuit having capacitance and inductance and an indicating element, such as a light bulb, that illuminates when a resonant condition is established in the circuit.

Figure 2:
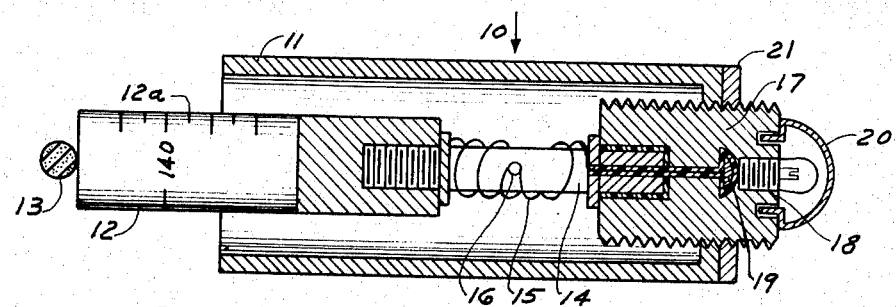
FIG. 2 is a partial cross section along the longitudinal axis of applicant's device.

FIG. 2 shows applicant's frequency device indicated generally at 10. The exterior is comprised of a hollow conductive cylindrical shell 11 that is rotatably connected to a moveable base 17 having threaded members around its exterior. Fixed to the threaded end of conductive shell 11 is an adjusting knob 21 having an irregular surface around its circumference to allow for the rotation of the cylinder 11 with respect to the removeable base 17. Fixed to the left side of moveable base 17 is an induction core 14. Inner capacitive plate 12 shown partially in cross section is connected to the left side of inductive core 14. Indicia, such as 12a, provide a means for reading the resonant frequency determined along the surface of the inner capacitive plate 12. A rubber tip 13 fixed to the inner capacitive plate 12 provides a resilient, insulated surface for positioning the frequency meter against the electric component, the frequency of which is to be measured. A coil of wire 15 is wound around induction core 14 and escutcheon pin 16. The coil 15 is wound to produce a high-Q circuit. On the right side of moveable base 17 is provided a resonance indicating means shown as light bulb 18 contacting the bulb socket contact 19. A bulb protective cover 20 is also anchored in moveable base 17 to provide protection for the light bulb 18.

Figure 3:
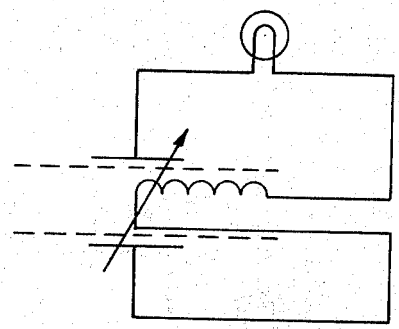
FIG. 3 is a schematic circuit diagram of applicant's invention.

Electrically, outer plate 11 and inner plate 12 act as a variable capacitor with the capacitance increasing as the outer plate is adjustably threaded toward the left end of inner plate 12. The inner plate 12 is electrically connected to coil 15 which is likewise connected to the light socket 19 and the outer capacitive plate 11. The circuit elements including coil 15, the light socket 19 and the core 14 are insulated electrically from the base 17 in a standard manner to provide electrical connection as shown in the schematic of FIG. 3. The outer cylindrical shell 11 being of a conductive material thus provides electromagnetic shielding of the coil 15 in both directions from without and from within. Thus, the inductive element 15 is electrically shielded as shown in FIG. 3 by the capacitive element in the circuit.

In operation, the frequency meter is positioned adjacent to an electrical radiating component whose frequency is to be measured and is rested on the resilient rubber tip 13. This provides proper physical separation between the frequency meter and the component to be tested. Exterior capacitive plate 11 is then adjusted by rotating the micrometer knob 21 to a position with respect to the inner capacitive plate 12 in which light bulb 18 reaches its maximum intensity. The shielding by shell 11 reduces the problem of overcoupling, thereby increasing the sensitively of the frequency meter and also eliminates weaker harmonic signals that would tend to reduce the accuracy of the meter. Also interferring radiation caused by coil 15 generated back to the electronic component being measured will be shielded also by the cylindrical shell 11, thus reducing interference generated from the testing device itself. An escutcheon pin 16 protruding from 14 allows the coil to be reverse wound, if desired, on the core so that higher Q readings are possible. The ends of core 14 are attached mechanically to moveable base 17 and inner capacitive wall 12 so that coil 15 is electrically connected between the inner capacitive wall and the light bulb 18.

The instant invention has been shown and described herein in what is considered to be the most practical and preferred embodiment. It is recognized, however, that departures may be made therefrom within the scope of the invention and that obvious modifications will occur to a person skilled in the art.

It is understood that different power outputs must be measured. The range of outputs measurable by applicant's device may be varied by employing light bulbs of different watt requirements, thus changing the resistance in the circuit. Correlating bulb watt size and bulb brilliance can give a rough estimate of the power output or the efficiency of a particular radiating device. A battery circuit could be included to establish a bulb brightness standard.

What is claimed is:

1. An absorption frequency meter comprising a high-Q electrical circuit capable of resonance and including:
   a capacitive means;
   an inductive means connected in series to said capacitive means;
   means for detecting resonance in said circuit connected to said inductive means and said capacitive means; and
   a means for shielding said inductive means electromagnetically to prevent overcoupling of said high-Q circuit.

2. A frequency meter as in claim 1, wherein:
   said shielding means is said capacitive means.

3. A frequency meter as in claim 2, wherein said capacitive means includes:
   an outer cylindrical plate; and
   an inner cylindrical plate, said outer cylindrical plate shielding said inductive means.

4. A frequency meter as in claim 3, wherein said inductive means includes:
   a core; and
   a coil of wire wound about said core connecting said inner capacitive plate to said detecting means.

5. A frequency meter as in claim 4, wherein said indicating means includes:
   a light bulb; and
   a light bulb socket.

6. A frequency meter as in claim 5, wherein said capacitive means includes:
   a means for incrementally moving said first outer capacitive plate with respect to said inner capacitive plate to vary the capacitance of said capacitive means, said inner plate having indicia representative of the resonent frequency of said circuit.

7. A frequency meter as in claim 6, including:
   a resilient positioning means fixed to one end of said inner capacitive plate for fixing said frequency meter in a particular position.

8. An apparatus as in claim 7, wherein:
   said coil is reversible wound about said coil to increase the Q sensitivity of said frequency detecting circuit.

9. A method of measuring the frequency of a RF oscillator comprising the steps of:
   a. positioning a high-Q circuit capable of resonance having variable capacitive and inductive elements adjacent to the RF oscillator source;
   b. shielding the inductive element with the capacitive element to prevent overcoupling of said high-Q circuit to said adjacent measured RF oscillator; and
   c. variably adjusting said capacitive element to produce a maximum voltage across an indicating means connected in said high-Q circuit.

10. A method of measuring frequency as in claim 9, including the step of:
    d. comparing the magnitude of the indicating means with a predetermined standard indicating means to ascertain the power output of said oscillator.

* * * * *